United States Patent [19]

Lacombat et al.

[11] 4,329,056
[45] May 11, 1982

[54] OPTICAL FIBER INTERFEROMETRIC RATE GYRO PARTICULARLY ADAPTED TO THE MEASUREMENT OF LOW ROTATIONAL SPEEDS

[75] Inventors: Michel Lacombat; Herve Lefevre, both of Paris, France

[73] Assignee: Thomson-CSF, Paris, France

[21] Appl. No.: 123,483

[22] Filed: Feb. 21, 1980

[30] Foreign Application Priority Data

Feb. 23, 1979 [FR] France .............................. 79 04660

[51] Int. Cl.³ .............................................. G01B 9/02
[52] U.S. Cl. .................................... 356/350; 356/351
[58] Field of Search .............................. 356/350–351; 331/94.5 S, 94.5 T, 94.5 ML

[56] References Cited

U.S. PATENT DOCUMENTS 4,259,016 3/1981 Schiffner .............................. 356/350

OTHER PUBLICATIONS

Goss et al., "Fiber Optic Rotation Sensor (FORS) Signal Detection & Processing", Opt. Engineering, Jan.–Feb. 1979, pp. 9–13.
Lee et al. "Measurement of Saturation Induced Optical Non Reciprocity in a Ring Laser Plasma", IEEE, Je. Quantum Elec., 8–66, pp. 235–243.
Davis et al. "Techniques for Shot Noise Limited Inertial Rotation Measurement Using a Multiturn Fiber Sagnac Interferometer", SPIE vol. 157, 1978, pp. 131–136.
Ulrich et al. "Fiber—Ring Interferometer: Polarization Analysis", Optics Letters, 5–1979, pp. 152–154.

Primary Examiner—William H. Punter
Attorney, Agent, or Firm—Oblon, Fisher, Spivak, McClelland & Maier

[57] ABSTRACT

The present patent application discloses an optical fiber interferometric rate gyro using the SAGNAC effect particularly adapted to the measurement of low rotational speeds comprising, between the radiation splitting and recombining device which directs two waves simultaneously towards the two ends of a single mode wound optical fiber and recombines the two waves emerging from the fiber after travelling in opposite directions at each of the two ends of the fiber, a splitter associated with a detector picking up a fraction of the wave emerging from the corresponding end, the speed measurement being obtained from signals from these detectors and from the signal from a detector picking up the radiation resulting from the recombination of both waves.

9 Claims, 3 Drawing Figures

OPTICAL FIBER INTERFEROMETRIC RATE GYRO PARTICULARLY ADAPTED TO THE MEASUREMENT OF LOW ROTATIONAL SPEEDS

FIELD OF THE INVENTION

The present invention relates to optical fiber interferometric rate gyros and more particularly to a rate gyro adapted to measuring low rotational speeds.

BACKGROUND OF THE INVENTION

An optical fiber interferometric rate gyro comprises principally a laser source, a device for splitting, and recombining the light, a single-mode wound optical fiber, a detecting device and a device for processing the detected signal.

The wave from the laser source is split into two waves directed towards both ends of the fiber so that one of these two waves is propagated in the direction of the rotational speed, the other being propagated in the opposite direction.

The light intensity detected after recombination of the two waves emerging from the two ends of the optical fiber is the result of interferences created between the two waves received. The phase shift between these two waves is directly tied to the rotational speed, SAGNAC effect, and this phase shift is calculated, from the detected intensity, by the processing device.

In conventional devices, the intensities of the two waves emerging from the two ends of the fiber are assumed to be linearly connected to the intensity supplied by the source, the coefficients of proportionality being constants which depend on the elements of the optical device whose characteristics are invariable in time. To get around the variations in the power of the light emitted by the source, and so the variations in power of the two waves received, the detected intensity is controlled from the real value of the emitted light power, and the phase shift connected to the value of the rotational speed is then determined from this single detected intensity resulting from interferences between the two emerging waves.

In practice, in the optical fiber interferometric rate gyro, the intensities of the two waves emerging from both ends of the optical fiber are not only connected to the incident light power but may also depend on couplings in the fiber, on the diffusion and on the mode of propagation in this fiber, these different factors varying in time and creating variations in intensity of the two waves emerging from the fiber cause variations in the light intensity detected which do not correspond to speed variations.

It is not possible to take these variations into account in the coefficients connecting the emerging intensities with the incident intensity because the conditions of propagation in the fiber vary in time.

SUMMARY OF THE INVENTION

The invention provides an optical fiber interferometric rate gyro comprising means for taking, before recombination, part of the waves emerging from the ends of the optical fiber, and a device for processing the signals for measuring, from the detected signal and from the characteristic signals of the two waves before recombination, the value of the phase shift due to the rotational speed of the rate gyro and so this speed itself.

This rate gyro is particularly adapted for measuring low rotational speeds for it reduces the noise superimposed on the variations of the detected intensity connected with the variations of speed, this noise being due to the fiber itself and to variations in the conditions of propagation of the waves in this fiber as a function of time.

An additional improvement consists, in order to provide better contrast, in optimizing the conditions of propagation in the fiber at all times, by adjusting by means of rotary half-wave plates the polarization of the incident radiation in the fiber to the natural directions of the fiber corresponding to a given mode of propagation, so that the two waves emerging from the fiber have, at all times, maximum intensities.

The above and other objects, features and advantages of the present invention will become apparent from the following description, given solely by way of non-limiting illustration, when taken in conjunction with the accompanying drawings.

DESCRIPTION OF THE PREFERRED EMBODIMENT

Figure 1:
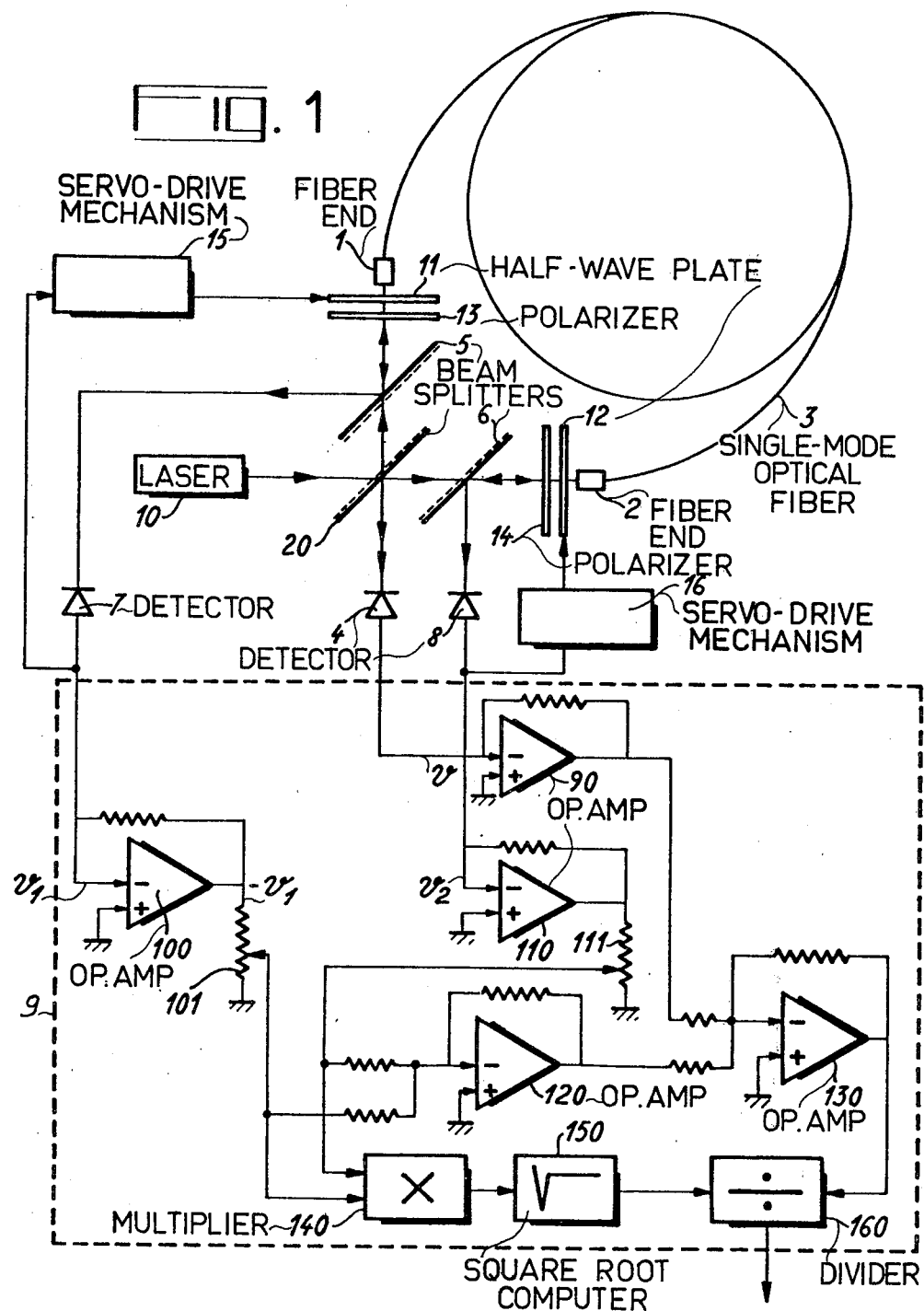
FIG. 1 shows schematically an optical fiber interferometric rate gyro according to the invention.

The rate gyro of the invention is described with reference to FIG. 1. By means of a splitting device 20, the light emitted by a laser 10 is directed to both ends 1 and 2 of a single-mode optical fiber 3. The two waves emerging from both ends of the optical fiber, after traveling in opposite directions in this fiber, are recombined on leaving by means of the same splitting device 20. A detector 4 receives light intensity I corresponding to the interference between the two waves emerging from the fiber, of respective intensities $I_1$ and $I_2$. The light intensity I depends on the intensities $I_1$ and $I_2$ and on the phase shift between the two waves: $\phi$. This phase shift $\phi$ is the sum of the phase shift $\phi_0$ due to the asymmetry of the reflection and transmission phenomena in the splitting device, and a phase shift $\phi_\Omega$ connected to the rotational speed $\Omega$ of the whole.

$$\phi_\Omega = \alpha \cdot \Omega \text{ with } \alpha = \frac{4\pi RL}{\lambda \cdot c}$$

$\lambda$ is the wavelength of the light used, L is the length of the wound fiber, R its radius, c the speed of the light. The detected intensity is:

$$I = I_1 + I_2 + 2\sqrt{I_1 I_2} \cos(\phi_\Omega + \phi_0).$$

The splitting device 20, which is a partially reflecting plate, may be chosen so that the fixed phase shift $\phi_0$, due to the difference in course between the two waves caused by the asymmetry of the two paths in the plate, is equal to $(\pi/2)$. Therefore, the signal detected by detector 4 is a substantially linear signal for low values of $\Omega$. The rotational speed $\Omega$ is then directly expressed as a function of the intensities of the two waves emerging from both ends of the fiber, $I_1$ and $I_2$, and of the detected intensity I:

$$\Omega = \frac{I - (I_1 + I_2)}{2a\sqrt{I_1 \cdot I_2}}.$$

The device of the invention comprises means for detecting, before recombination of the two waves, a fraction of these two waves proportional to the intensities $k_1I_1$ and $k_2I_2$ and a processing device for obtaining directly the value of the rotational speed from the detected intensities I, and $k_1I_1$ and $k_2I_2$.

For this purpose, the rate gyro comprises a partially reflecting plate 5 placed between the semi-transparent plate 20 and the end 1 of the fiber and a partially reflecting plate 6 placed between plate 20 and the end 2 of this fiber. The radiation reflected by plate 5 is detected by means of a detector 7. The radiation reflected by plate 6 is detected by means of a detector 8. The voltage v provided by detector 4 and the voltages $v_1$ and $v_2$ provided respectively by detectors 7 and 8 are characteristic of the light intensities received by these detectors. The rate gyro shown in FIG. 1 comprises an analog signal processing device 9. This processing device comprises an operational amplifier 90 connected as an inverter amplifier which receives the output voltage from detector 4. The device comprises furthermore two operational amplifiers 100 and 110 connected as inverter amplifiers and receiving respectively the output signals from detectors 7 and 8. The outputs of amplifiers 100 and 110 are connected to ground respectively through potentiometers 101 and 111. An operational amplifier 120 connected as an adder receives output voltages from potentiometers 101 and 111 and supplies a voltage proportional to $I_1+I_2$. A second operational amplifier 130 connected as an adder receives the output voltage from amplifier 120, and the output voltage from operational amplifier 90 proportional to $-v$. The output voltage from operational amplifier 130 is then equal to: $k[I-(I_1+I_2)]$ when the gains of amplifiers 100 and 110 and the adjustments of potentiometers 101 and 111 are such that, for $\Omega=0$, the output signal from amplifier 130 is zero, (k is a constant). A multiplier 140 also receives the output voltages from potentiometers 101 and 111, the output voltage from multiplier 140 being proportional to the product $I_1 \cdot I_2$. The output from this multiplier is connected to the input of a circuit 150 for extracting the square root $\sqrt{I_1 \cdot I_2}$; the output signal from this circuit 150 is applied to an input of a divider 160 which receives at its other input the output signal from operational amplifier 130 connected as an adder. The output signal from divider 160 is then proportional to:

$$\frac{I - (I_1 + I_2)}{\sqrt{I_1 \cdot I_2}}$$

and so to $\cos(\phi\Omega + \phi_0)$. If $\phi_0$ is equal to $(\pi/2)$ and if $\Omega$ is low, this signal is directly proportional to the rotational speed $\Omega$.

Processing device 9 provides then analog processing of the detected signals. But it is also possible, in order to achieve the same operation, to effect digital processing of the signals after analog-digital conversion of the output signals of detectors 4, 7 and 8. This digital processing may be carried out for example by a microprocessor. Because the pass-band of the system is limited only to a few Hertz, the digital processing device does not necessarily have to be rapid. The rate gyro of the invention comprising such a processing device may then obtain an accurate measurement of the rotational speed at which it is driven.

Furthermore, for improving contrast, it is possible to arrange for the signals detected by detectors 7 and 8 to have at all times a maximum value. For that it is necessary to adjust the polarization at the input of the fiber to the natural directions of polarization of this fiber so that the conditions of propagation are optimum. In fact, a so-called single-mode fiber has, from the energy point of view, only a single mode of propagation. But if we are concerned with polarization, mechanical and thermal stresses, curves and twists of the fiber, defects in the core and in the sheath, form overall disturbances which select privileged modes of propagation. For a given fiber, with its disturbances, it is possible to define at the input two natural directions of polarization perpendicular to each other and at the output two others still perpendicular to each other, but which have rotated in relation to the input. One natural input direction defines with the corresponding natural output direction a non-degenerated mode of the fiber. The two corresponding modes have a phase shift therebetween. The natural directions at both ends of the fiber are the same for the two directions of propagation at a given moment. But the disturbances of the fiber develop and modify these natural directions of polarization at the ends as a function of time. Since the stability of polarization is very good for a period of several seconds, it is possible to use a device for adjusting the polarization of the incident radiation at one end of the fiber to one of the two natural directions and for adjusting the polarization of the incident radiation at the other end of the fiber to the natural output direction corresponding to the mode used for inputting into the first end of the fiber. By completing this device with a servo-control device for rectifying this adjustment, it is possible to obtain at all times coincidence between the natural directions at the ends of the fiber defining one mode of propagation and the polarizations of the two fractions of the incident radiation at these two ends. For that, between plate 5 and the end 1 of the wound optical fiber are disposed respectively a polarizer 13 and a half-wave plate 11. Between splitting plate 6 and the end 2 of the wound optical fiber are disposed a polarizer 14 and a half-wave plate 12. Polarizers 13 and 14 select the radiation from the source having a rectilinear polarization $\vec{P}_i$.

Figure 2:
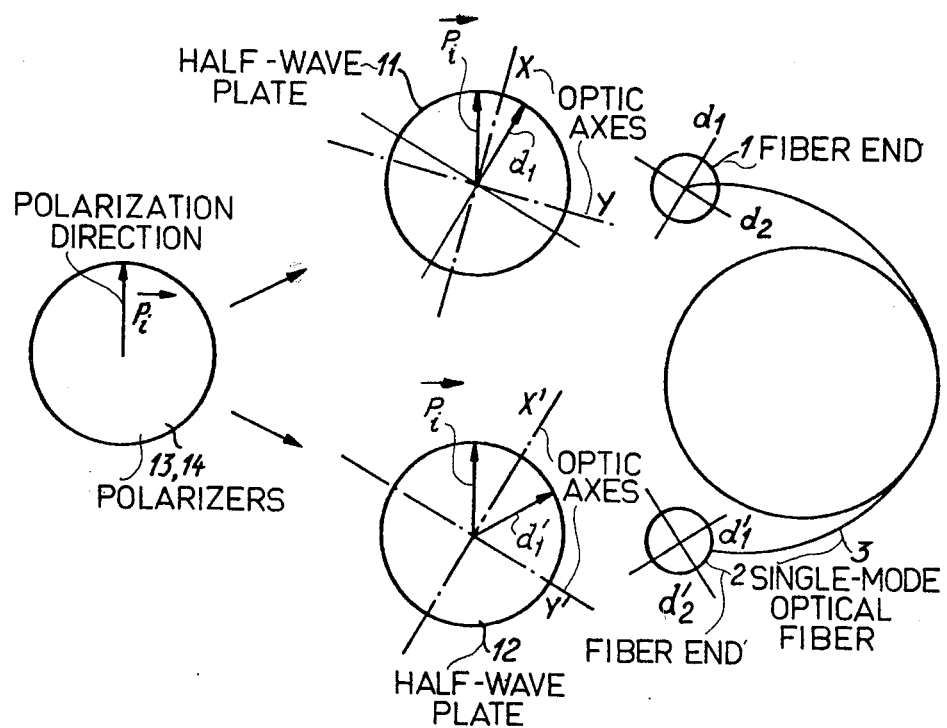
FIG. 2 is a diagram showing the development of the polarization of the radiation along the optical path.

FIG. 2 shows the development of the polarization along the optical path. Half-wave plates 11 and 12 are rotatable and have neutral lines respectively (X, Y) and (X', Y'). The ends of optical fiber, 1 and 2, have perpendicular natural directions, $d_1$ and $d_2$, for end 1 and $d'_1$, $d'_2$ for end 2. If, as mode of propagation, the mode corresponding to natural directions $d_1$ and $d'_1$, is chosen, the neutral lines of half-wave plate 11 are rotated in relation to the respective directions of the the incident polarization $\vec{P}_i$ and of natural direction $d_1$, the neutral lines X', Y' of the half-wave plate 12 being rotated depending on the directions of the incident polarization $\vec{P}_i$ and of the natural direction $d'_1$ corresponding to the chosen mode of propagation. In practice, this rotation is such that axis X is directed along the bisetrix of directions $\vec{P}_i$ and $d_1$, X' being directed along the bisetrix of directions $\vec{P}_i$ and $d'_1$. The development of polarization along the optical path for the wave transmitted at end 1 and emerging at end 2 is then the following: $\vec{P}_i$ on leaving polarizer 13, $d_1$ on leaving half-wave plate 11, $d'_1$ after traveling in the fiber and $\vec{P}_i$ on leaving half-wave plate 12. The incident wave at end 2 of the optical fiber has a polarization which develops as follows: $\vec{P}_i$ on leaving polarizer 14, $d'_1$ on leaving half-wave plate 12, $d_1$ on leaving the fiber after traveling in the winding, and $\vec{P}_i$ after passing through half-wave plate 11.

To maintain these ideal conditions of propagation, a servo-control is provided so that the half-wave plates 11 and 12 are always correctly positioned in relation to the natural directions of the fiber. The corresponding servo-control circuits, 15 and 16 in FIG. 1, are controlled respectively by the output signals of detectors 7 and 8, and supply control signals to half-wave plates 11 and 12 for rotating them so that the signals detected by detectors 7 and 8 are always at their maximum level.

Figure 3:
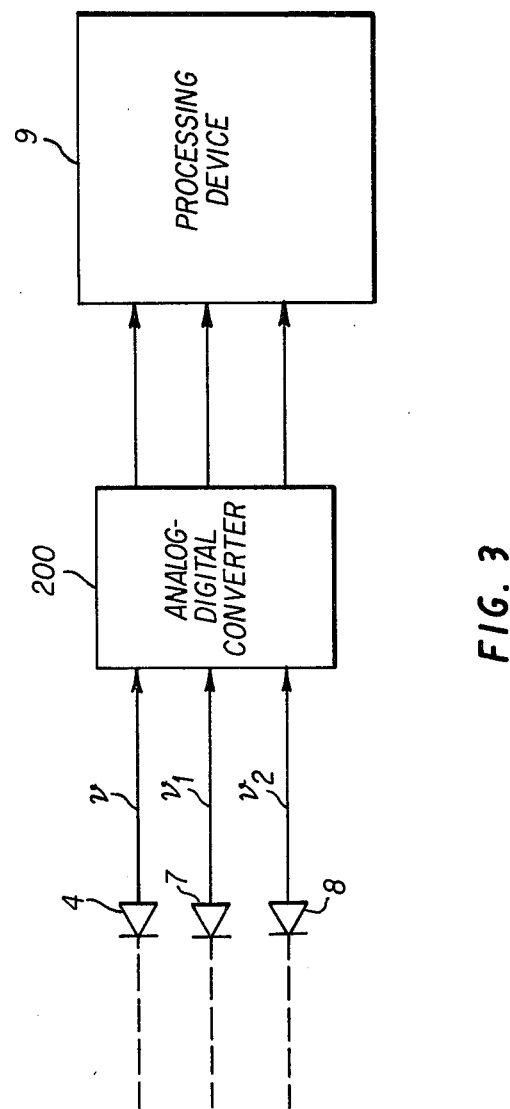
FIG. 3 is a block diagram illustrating generally a digital implementation portions of the gyro of the invention.

The invention is not limited to the embodiment of the rate gyro described and shown with reference to FIG. 1. In particular, as was mentioned above, the processing carried out on the output signals of detectors 4, 7 and 8 may be digital processing as shown schematically in FIG. 3, in which the processing device 9 is preceded by a digital-analog converter 200. Furthermore, the role of the mobile servo-controlled half-wave plates may be played by the fiber itself, the rotation of polarization being obtained for example by application of mechanical stresses to a certain length of the fiber. However, the effect used should be reciprocal, so that the rotation of polarization introduced is equal to $\alpha$ for one direction of propagation ($\vec{P}_i$, $d_1$) and $-\alpha$ for the other direction of propagation ($d_1$, $\vec{P}_i$).

It is apparent that within the scope of the invention, modifications and different arrangements can be made other than is here disclosed. The present disclosure is merely illustrative with the invention comprehending all variations thereof.

What is claimed is:

1. An optical fiber interferometric rate gyro particularly adapted to the measurement of small rotational speeds comprising a coherent light source, a wound optical single-mode fiber, a device for splitting and recombining the radiation for splitting the radiation from said source into two waves directed respectively towards the two ends of said fiber and for recombining said two waves emerging from the fiber after traveling in opposite directions, a first device for detecting the radiation resulting from the recombination, additional splitters and respective second and third detecting devices disposed between said splitting and recombining device and each of the ends of said fiber for detecting a fraction of each of the waves emerging from the fiber prior to recombination of the waves emerging from the fiber, and processing means for determining rotational speed based on a predetermined relationship between the recombined wave detected by said first detecting device and the respective fractions of the waves emerging from the fiber as detected by said second and third detecting devices.

2. The rate gyro as claimed in claim 1, wherein said processing device processes the detected signals so that the signal from the processing device is proportional to $$\frac{I - (I_1 + I_2)}{\sqrt{I_1 I_2}},$$

I being the intensity of the radiation received by said first detecting device receiving the two recombined waves, and $I_1$ and $I_2$ being the intensities of the two recombined waves giving rise to this detected intensity I, $I_1$ and $I_2$ being proportional to the intensities received by said second and third detecting devices associated with said splitters.

3. The rate gyro as claimed in claim 2, wherein the processing device is an analog type device.

4. The rate gyro as claimed in claim 2 comprising furthermore analog-digital conversion means and wherein said processing device is a digital type device.

5. The rate gyro as claimed in claim 1 comprising furthermore, between each of said splitters and the end of said corresponding optical fiber devices for rotating the direction of polarization of the incident radiation and for adjusting it at each end of said fiber to a natural direction of said fiber corresponding to a given mode of propagation.

6. The rate gyro as claimed in claim 5 in which said devices for rotating said direction of polarization of the radiation comprise suitably-orientated half-wave plates.

7. The rate gyro as claimed in claim 5, wherein each of said devices for rotating said direction of polarization comprises adjustment means.

8. The rate gyro as claimed in claim 7, comprising furthermore two servo-control loops each receiving the output signal of one of said second and third detecting devices and supplying a control signal to said adjustment means so that said direction of polarization of the radiation is adjusted in order that said fractions of the radiation taken may be maximum at all times.

9. The rate gyro as claimed in claim 8, wherein said servo control loops cause the orientation of said half-wave plates to rotate in a plane parallel to their principal faces so that their neutral lines are at all times directed along the bisetrices of angles formed by the direction of polarization of the incident radiation and the natural direction of polarization corresponding to the mode of propagation at the end of said corresponding fiber.

* * * * *